Feb. 10, 1970 B. R. GOOCH 3,495,048

MAGNETIC HEAD ASSEMBLY USING HOUSING AS CORE MEMBER

Filed Aug. 24, 1967 2 Sheets-Sheet 1

INVENTOR.
BEVERLEY R. GOOCH

BY Thomas E. Schatzel

ATTORNEY

MAGNETIC HEAD ASSEMBLY USING HOUSING AS CORE MEMBER

Filed Aug. 24, 1967 2 Sheets-Sheet 2

INVENTOR.
BEVERLEY R. GOOCH
BY Thomas E. Schatzel
ATTORNEY

United States Patent Office 3,495,048
Patented Feb. 10, 1970

3,495,048
MAGNETIC HEAD ASSEMBLY USING HOUSING AS CORE MEMBER

Beverley R. Gooch, Sunnyvale, Calif., assignor to Ampex Corporation, Redwood City, Calif., a corporation of California Filed Aug. 24, 1967, Ser. No. 663,091
Int. Cl. G11b *5/10, 5/28*
U.S. Cl. 179—100.2 9 Claims

ABSTRACT OF THE DISCLOSURE

The present invention pertains to a magnetic head assembly preferably adapted for use in association with a magnetic tape recorder/reproducer. The head assembly includes a pair of Mumetal brackets which simultaneously serve as core members and support structures, at least one ferrite pole member spanning each bracket, an energizing coil surrounding the pole member and means securing the brackets and pole members in position such that the brackets and pole members complete a magnetic circuit.

Background of prior art

The head assembly of the present invention has been found to function extremely well when used for erasing signals recorded on a magnetic tape medium. The erase head assemblies of the prior art and known to the inventor, primarily center about assemblies of which the core and pole members comprise the same materials. That is, both members comprise ferrite material or both members comprise Mumetal. The all-ferrite structures, while providing highly desirable electrical characteristics are costly. This is due, at least in part, to the fact that ferrite members must be machined or casted. The all Mumetal structures generally do not provide the necessary electrical characteristics without sacrificing the price advantage. Also, those assemblies which comprise all Mumetal generally require individual support means and shields to house the entire assembly. For the modern magnetic recording technology, especially in the consumer audio tape recorder/reproducers, such prior art assemblies impose limitations in efficiency of operation, cost of manufacture and large size.

Summary of the invention

The head assembly of the present invention includes a Mumetal bracket which serves the dual purpose of a core member and a mechanical support for ferrite pole pieces spanning the brackets. The core members and pole pieces form a magnetic circuit. The Mumetal may be designed as a three-walled channel-shaped member which can be fabricated in one manufacturing operation, e.g., by stamping. Gap spacers may be provided about one end of the pole pieces intermediate otherwise intimate points of the pole members and brackets. Surrounding each pole member is an energizing coil, which when excited creates the necessary ampere-turns to realize an adequate magnetic flux about the gap spacer for erasing previously recorded signals on a magnetic media passing adjacent the gap spacer. The intricacies of the bracket and pole members may be secured in position by epoxy or other securing means.

As a result of the design of the brackets, the brackets are easily manufactured in large quantities, assembly is simplified and consequently manufacturing costs are substantially reduced. The structure lends itself to a relatively short magnetic circuit path and hence the physical size of the bracket and head assembly is substantially reduced over prior used assemblies.

Furthermore, the use of ferrite pole pieces minimize losses (e.g., eddy currents). Therefore, less electrical power is required to drive the head and more erasure per ampere-turn is realized. As will be hereinafter illustrated in detail the equivalent parallel resistance (generally recognized in the art as the figure of merit) is substantially higher than that realized by erase heads of the prior art.

Description of preferred embodiments

Figures 1, 2, 3:
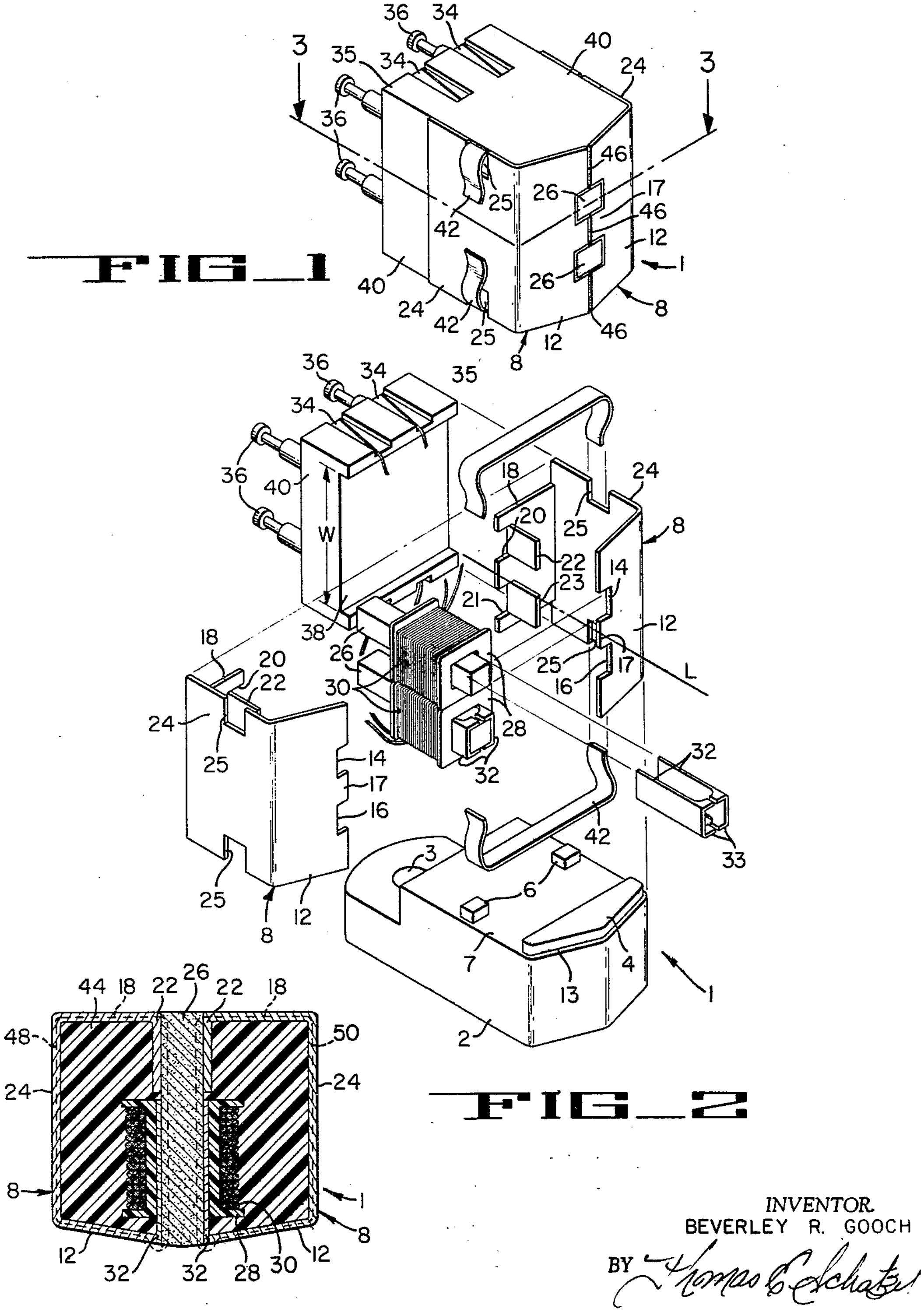
FIG. 1 is an enlarged perspective view of an assembled audio-signal magnetic-erase head according to the teachings of the present invention.
FIG. 2 is an enlarged exploded view of the head assembly of FIG. 1.
FIG. 3 is a cross-sectional view of the head assembly of FIG. 1 and illustrating the magnetic circuit paths of the head assembly.

The specific description of the invention is directed to an audio-signal erase head of the type employing a plurality of non-magnetic gaps formed by a core member and center-bar pole member carrying an energizing coil. FIGS. 1, 2 and 3 illustrate a two-channel erase head assembly, referred to by the general reference character 1. FIG. 1 illustrates in perspective, one version of the head assembly 1 which has proven satisfactory for erasing two tracks of a previously recorded magnetic tape carrying audio signals. FIG. 2 illustrates an exploded version of the head assembly 1 and FIG. 3 illustrates, in part, a cross-sectional view taken along a line 3—3 of FIG. 1.

The head assembly 1 includes a mounting head base 2 (see FIG. 2) which serves as a mechanical support. The base 2 has an aperture 3 to receive a pin or fastener for securing the head assembly in position on a tape recording unit (not shown). The base 2 is illustrated in the form of a preformed aluminum structure or premolded plastic support carrying guide means in the form of an outer guide 4 and a pair of aligned inner guides 6 on its upper exposed surface plane 7. The surface plane 7 of base 2 may be sand-blasted to provide better adherence to an epoxy disposed thereabout.

Mounted on and normal to the plane surface 7 of the head base 2 is a bracket support means illustrated in the form of a pair of three-sided channel-shaped brackets referred to by the general reference character 8. The brackets 8 and arranged such that they confront each other and preferably comprise a mu-metal material so as to allow them to be fabricated by a standard stamping machine. The thickness of the bracket material may be selected to allow for manufacture by standard stamping procedures and equipment. The thickness of the brackets is selected for favorable fabrication and low eddy current losses. If the material is too thick the eddy current losses impose a limiting factor. If the material is too thin, structural support is sacrificed. Favorable results have been realized when the thickness is in the order of 0.010–0.025 inch. While providing an easily fabricated material, mu-metal has a relatively low reluctance and provides a highly satisfactory magnetic path. This allows it to be used as a core member for the erase head assembly. Though FIGS. 1, 2 and 3 illustrate the brackets 8 as two separate severed members, as will be shown by FIG. 6(A) it is not essential that they be severed about their respective sides 12. The brackets 8 are of substantially identical form and symmetrical about their respective longitudinal axis L. This permits the manufacture of a large number of brackets 8 and any two can subsequently be assembled as part of a complete head assembly. It is not necessary to separate and sort the various brackets 8 for a matching pair since all brackets are the same.

The three-sided brackets 8 each carry a first or top side 12 sloped at an angle substantially coinciding with the edge of guide 4. The slopes of the top sides 12 are adapted so as to permit a magnetic recording medium to glide thereover. The surface planes of the sides 12 are normal to the surface plane of the head base 2 and the guide 4. The shape and positioning of the guides 4 and 6 provide a means for aligning the brackets 8 and base 2 in proper relationship and render structural support between the brackets. The edge of the guide 4 coincides with the angle at which sides 12 meet and is set back to a distance to form a ledge 13 to accommodate the thickness of the bracket 8. The guides 6 are also set back to accommodate the brackets 8. The top sides 12, as illustrated, each carry a pair of indentations 14 and 16. As will hereinafter be described, the indentations 14 and 16 are designed to accommodate pole members necessary for completing the magnetic path of the head assembly. The indentations 14 and 16 are separated by a tab 17, the width of which may be of the same order or greater than the width of the indentations. The brackets 8 each carry a second or bottom side 18 which is spaced from first side 12 and is substantially normal to the surface plane 7 of the base 2. The sides 18 each have a pair of indentations 20 and 21 which are respectively aligned with the indentations 14 and 16 of the sides 12. Illustrative of the small size the head assembly 1 may take, the longitudinal spacing between the top sides 12 and bottom sides 18 may be in the order of less than one-third inch and the composite height from the bottom of the base 2 to the top edge of the sides 12 in the order of one-half inch. Adjoining indentations 20 and 21 respectively, are integral tabs 22 and 23 substantially normal to the sides 18 and extending inwardly with respect to the brackets 8. Each of the bracket members has a third side 24 connecting the respective sides 12 and 18 and wherein sides 24 each carry a pair of opposing indentations 25, approximately midway between the sides 12 and 18. Spanning the brackets 8 and resting longitudinally within the indentations 14 and 20, and within the indentations 16 and 21, are a pair of substantially indentically dimensioned elongate pole members, each referred to by the numeral 26. To facilitate the ease of manufacture and assembly, the members 26 each may be in the form of a rectangular bar having a square cross-section. The pole members preferably comprise a low-loss ferrite material commonly found in magnetic head assemblies. The tips of each pole rest laterally with relationship to each other and within the registering indentations 14 and 16 flush with the exterior of the sides 12. Also surrounding each pole member is a bobbin 28 carrying an energizing coil 30. Each coil 30 carries sufficient turns such that when current is applied an ampere-turn rating is realized for creating an adequate magnetic flux density. To aid manufacturing the head assembly 1, the bobbin 28 surrounding the lower pole member 26, as viewed in the drawing, may be positioned with its lower flange resting intermediate the inner guides 6, and the upper flange abutting the bottom edge of the external guide 4. The guides 6 may be so designed and positioned to simultaneously receive the brackets 8 and a bobbin without permitting excessive intermediate spacing. The bobbin 28 surrounding the other pole member 26 may be laterally aligned with the first bobbin.

Around the upper tip of each of the pole members 26 is a pair of three-sided shields or gap spacers 32. Each of the spacers 32 is matingly interspaced between the otherwise intimate contacting surface portions of the indentations 14 and 16 and the longitudinal surfaces of the respective pole member 26 adjacent the exterior of topsides 12. The proper dimensioning of the parts enables each of the brackets or core members 8 to simultaneously intimately contact the pole members 26 and their associated spacers 32. Each spacer 32 has laterally spaced ears which aids in magnetically insulating the cores 8 and pole members 26 at the gap. It may also be noted that the poles 26 rest intimately with the tabs 22 and 23 providing a low reluctance path at that point. This design enables the establishment of a reliable and accurately dimensioned magnetic circuit between each pole member 26 and each bracket 8. As it is well known in the art, a gap spacer within the magnetic path provides for the creation of an external impinging flux about said gap. In the present instance the gap spaces 32 are so arranged that the external flux penetrates a magnetic tape medium passing over the gap. The nature of the material of the gap spacer 32 may be in the form of any of various well known non-magnetic metallic or non-metallic material. As is well known in the art, copper foil provides a highly satisfactory gap material. Preferably, a beryllium copper foil is incorporated. Such material has a relatively high resistivity and is easy to shape for proper alignment.

The terminal leads of the energizing coils 30, as illustrated, are each adapted for external electrical connection by passing within an exterior channel 34 of a Bakelite terminal board 35 and attached to a respective terminal post 36 supported by the board. The terminal posts 36 protrude from the outer exposed surface of the board 35. The terminal board 35 provides additional support and positioning means for the purposes of assembly while providing a means for electrical connection of the windings 30 to the exterior. The board 35 has an internal surface in the form of a channel 38 having a width W slightly greater than the width of the sides 18 of the brackets 8. The channel 38 is substantially normal to the head base 2 and the sides 24 of the brackets 8. Thus, the sides 18 may engage the board 35 within the channel 38. It may be noted that the sides 18 and the channel 38 are slightly less in width than the sides 24 of the brackets 8. Thus, each of the sides 24 engage the terminal board 35 at an end surface 40 coinciding with the end of the channel 38. This aids in locating and interlocking the brackets 8, the base plate 2 and the terminal board 35 in relationship to each other.

To provide additional support, the brackets 8 are urged together by a pair of spring clamps 42 which engage the brackets within the respective indentations 25 on opposing sides 24. The head assembly may be filled with a plastic material or epoxy resin 44 (FIG. 3). The epoxy 44 is inserted after the head assembly is assembled and positioned in a potting die. The epoxy when in the liquid state penetrates the otherwise void areas and when cured adheres to the internal surfaces of the brackets 8, the pole members 26, the coils 30 and the exposed portions of the spacers 32. It should be noted that no additional secure support and shielding structures are required to secure the head assembly 1 in position. In fact, it has been found in many applications that the use of the epoxy in itself is an adequate means for securing the head assembly thereby alleviating the need for the spring clamps 42. It has also been found desirable that after the head assembly is epoxed and cured it is desirable to lap the head at a given radius about the surface of the top sides 12. Where a standard four-track audio-magnetic tape is to be accommodated, the spacing between the indentations 14 and 16 may be such that two alternate tracks e.g. tracks one and three or tracks two and four may be simultaneously erased. The designing of the tab 17 so that its width equals or exceeds the width of the pole members 26 allows track two or track three to pass intermediate the pole members with minimized crosstalk. In a stereo recorder/reproducer, two head assemblies 1 may be utilized—one to erase tracks one and three and the other to erase tracks two and four.

It may be noted in FIG 1 that in the completed assembly there is a small spacing between the non-indented portions of the contiguous edges of sides 12 of the brackets 8. This spacing gap is designated by the numeral 46 and has been found to provide high efficiency when in the order of less than ten mils and preferably approximately seven mils. The gap 46 is penetrated by the epoxy material 44, and by limiting the amount of epoxy to approximately seven mils it has been found that it minimizes oxide pickup which could also cause scraping of a tape medium passing thereover. Also, by providing the gap 46 crosstalk is further minimized.

The diagram of FIG. 3 illustrates by the broken lines 48 and 50 that two magnetic circuits are provided for each pole member 26. The gap spacers 32 form two non-magnetic gaps which facilitates the removal of any recorded signal from an associated tape medium when the coils 30 are energized. It should be understood that notwithstanding the common core or brackets 8, there is substantially no crosstalk between the magnetic paths defined by the pole members 26 as the flux travels along the shortest or lowest reluctance path.

Figure 4:
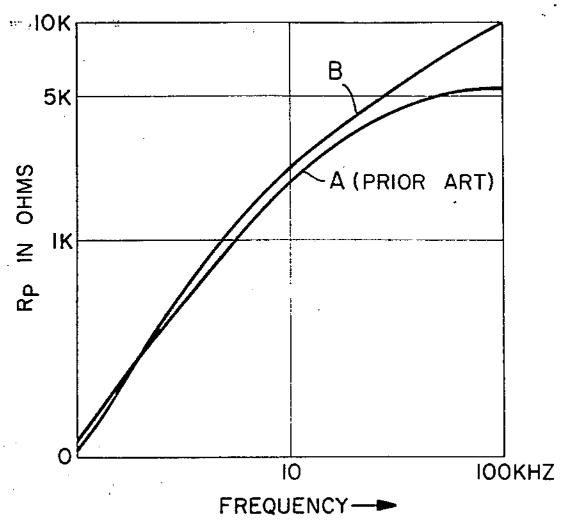
FIG. 4 graphically represents the figure of merit of a head assembly of the present invention and a prior art assembly by illustrating the equivalent parallel resistance versus frequency of the head assemblies.
Figure 5:
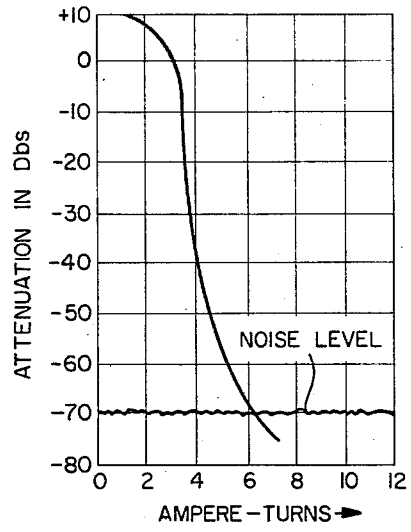
FIG. 5 is a graphical representation of the attenuation in decibels versus ampere-turns of a head assembly of the present invention.

The diagrams of FIGS. 4 and 5 are included to illustrate the electrical characteristics which have been realized from magnetic erase head assemblies incorporating the teachings of the present invention. It has been previously mentioned that the use of ferrite pole members minimizes losses and therefore less power is required to drive the head assembly and more erasure per ampere-turn is achieved. To graphically illustrate this feature, FIG. 4 shows characteristics demonstrating what is commonly referred to in the art as the "figure of merit" of a head assembly. The "figure of merit" is generally viewed as the ratio of the equivalent parallel resistance ($Rp$) to the inductive reactance of a head assembly at a specific frequency. The equivalent parallel resistance is representative of the losses within the head. The higher the parallel resistance the less the required current to creat the necessary power for removing a given recorded signal from a magnetic medium. Ideally, without any eddy currents, the parallel resistance increases linearly as the frequency increases at a rate of six decibels per octave. Since the inductive reactance increases substantially linearly, this provides an ideal "figure of merit." With eddy current taken into consideration, the equivalent parallel resistance tends to level out at the higher frequencies rather than increase at the linear rate in prior art structures. This is illustrated by the curve A in FIG. 4. FIG. 4 further illustrates by curve B that the "figure of merit" of the head assemblies incorporating the teachings of the present invention are substantially more linear. At approximately 100 kHz., curve A is substantially horizontal at approximately five kilohms. At the same frequency curve B is at approximately ten kilohms and maintains a substantial positive slope. In actuality, a majority of tested head assemblies incorporating the teachings of the present invention had an $Rp$ at 100 kHz. in the range of 12–14.5 kilohms. The prior art structure tested and providing the curve B is one widely used as an erase head for audio magnetic recorder/reproducers and of which the core and pole members are both made of a mu-metal material.

FIG. 5 is graphical illustration of the erasing characteristics of the head assembly 1. Attenuation is shown with the ordinate scale calibrated in decibels and the abscissa in ampere-turns. To acquire the characteristics of FIG. 5, a magnetic tape was recorded with a constant 700 Hz. signal at ten decibels above operating level. The tape was then passed over the erase head assembly 1 at a speed of seven and one-half inches per second. The energizing coil carried 510 turns of AWG 44 wire and had an erase frequency of 100 kHz. After being passed over the erase head assembly 1 the tape was replayed to determine the level at which the signal still existed on the tape. It may be noted that for four ampere-turns the decibel level is approximately minus forty decibels or fifty decibels lower than was the recorded signal. At six ampere-turns the signal was approximately minus eighty decibels below the recording level and close to the noise level. Accordingly, FIG. 5 illustrates that the eraser characteristics of the head assembly perform admirably well with low ampere-turns and a small amount of electrical power.

Accordingly, the present invention provides an assembly for an erase head which electrically provides high efficient operation. A small amount of power is required to acquire a desired erase characteristic. At the same time the head assembly is economical in that the mu-metal core members simultaneously serve the purpose of support means and part of the magnet manufactured allows for low overall costs. At the same time, the magnetic path is short and allows for an assembly of small size and also for less eddy currents. The low cost, small size, high efficiency makes the head highly desirable for the use in consumer audio recording equipment for which the present trend is toward low price and small size tape recorders.

Figure 6A:
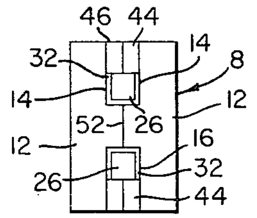
FIGS. 6(A) and 6(B) are top views of alternate embodiments of erase head assemblies according to the teachings of the present invention.
Figure 6B:
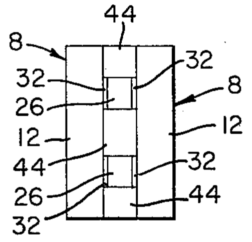

FIGS. 6(A) and 6(B) illustrate that the teachings of the present invention and bracket support means are not limited to the design previously discussed. In FIG. 6(A) the two brackets 8 are intimately joined together in that the top sides 12 are permanently joined and stamped from a common piece. The surfaces are bent at an apex 52 and the gap spacers 32 are intimate with three sides of the respective pole member 26. The gap 46 between the top side surfaces is substantially wider than that of the design of FIGS. 1, 2 and 3 so that a greater amount of the epoxy 44 is exposed. The pole members 26 are adequately spaced so as to permit a third channel to pass intermediate without substantial crosstalk effects of the magnetic fluxes created within the respective magnetic circuits.

The design of FIG. 6(B) is such the bracket support means includes two separate bracket pieces. Though of different design than that of FIGS. 1, 2 and 3 the core pieces carry the reference numeral 8. The brackets 8 of FIG. 6(B) omit the indentations 14 and 16 and the top side surfaces 12 are separated by a distance coinciding with the composite width of the pole members 26 and gap spacers 32. Intermediate the sides 12 and within the otherwise void areas is an exposed portion of the epoxy 44.

I claim:

1. A magnetic head assembly comprising in combination:

a bracket support comprising a pair of separate channel shaped members formed of mumetal each having first and second spaced apart sides and a third side connected therebetween, said members being arranged in confronting and symmetrical relationship with the edges of corresponding first and second sides contiguous with one another, the contiguous edges of said first sides being formed with registering indentations;

an elongate pole member formed of ferrite material mounted within said bracket support transversely spanning said channel members, said pole member having one end received by said indentations of said first sides and the other end engaging said second sides of said members to form a magnetic circuit with said bracket support;

non-magnetic gap spacers matingly interspaced between said pole member and portions of said first sides circumscribing said indentations;

an energizing coil surrounding said pole member and having terminal leads adapted for external electrical connection; and spring clip means engaging and securing said channel members in said confronting relationship.

2. The magnetic head assembly of claim 1 in which the second side of each channel member has an indentation aligned with the indentation of the associated first side, the indentations carried by the second sides adapted to receive the end of the pole member adjacent thereto.

3. The magnetic head assembly of claim 2 in which said second sides of said members are formed with integral tabs extending inwardly with respect to said bracket from said member indentations and engaging said pole member.

4. The magnetic head assembly of claim 1 further including a head base member having an upper exposed surface plane substantially normal to the planes of said member sides, the base member receiving and supporting the channel members.

5. The magnetic head assembly of claim 4 in which the head base member carries guide means for aligning the channel members in relationship to each other.

6. The magnetic head assembly of claim 4 further including a terminal board having an exterior surface adapted to receive said terminal leads and an internal surface substantially normal to the plane of the head base member, said internal surface including means for interlocking with said second and third sides of said channel members.

7. The magnetic head assembly of claim 1 in which said pole member and gap spacers are dimensioned relative to the indentations of said first sides such that spacing is provided between the non-indented portions of said contiguous edges upon assembly of said members in said confronting relationship.

8. The magnetic head assembly of claim 7 in which the spacing between non-indented portions of contiguous edges of said first sides is in the order of ten mils.

9. The magnetic head assembly of claim 8 in which the physical thickness of the channel members is within the range of 0.010–0.025 inch.

References Cited

UNITED STATES PATENTS

| | | | |
|---|---|---|---|
| 2,950,355 | 8/1960 | Moehring | 179—100.2 |
| 3,233,046 | 2/1966 | Moering | 179—100.2 |
| 3,357,097 | 12/1967 | Schulte | 179—100.2 |
| 3,358,275 | 12/1967 | Schulte | 179—100.2 |
| 3,358,276 | 12/1967 | Schulte | 179—100.2 |
| 3,359,629 | 12/1967 | Smith | 179—100.2 |

BERNARD KONICK, Primary Examiner

JEROME P. MULLINS, Assistant Examiner

U.S. Cl. X.R.

340—174.1; 346—74